US012464431B2

(12) United States Patent
Jain et al.

(10) Patent No.: US 12,464,431 B2
(45) Date of Patent: Nov. 4, 2025

(54) ULTRA-BROADBAND RADIO LINK IDENTIFICATION FOR OUTDOOR SMALL CELL SITE LOCATIONS

(71) Applicant: Rakuten Symphony, Inc., Tokyo (JP)

(72) Inventors: Sudeep Jain, Indore (IN); Durgesh Rathore, Indore (IN); Shanu Kore, Indore (IN); Keshav Sharma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/800,005

(22) PCT Filed: Jun. 16, 2022

(86) PCT No.: PCT/US2022/033718
§ 371 (c)(1),
(2) Date: Aug. 16, 2022

(87) PCT Pub. No.: WO2023/244229
PCT Pub. Date: Dec. 21, 2023

(65) Prior Publication Data
US 2024/0298240 A1      Sep. 5, 2024

(51) Int. Cl.
*H04W 40/20*    (2009.01)
*H04W 48/16*    (2009.01)
*H04W 76/10*    (2018.01)

(52) U.S. Cl.
CPC ........... *H04W 40/20* (2013.01); *H04W 48/16* (2013.01); *H04W 76/10* (2018.02)

(58) Field of Classification Search
CPC ..... H04W 40/20; H04W 48/16; H04W 76/10; H04W 40/12; H04W 40/205
See application file for complete search history.

(56) References Cited

U.S. PATENT DOCUMENTS

| | | | |
|---|---|---|---|
| 2012/0147782 A1* | 6/2012 | Puthenpura | H04W 40/24 370/254 |
| 2017/0345070 A1 | 11/2017 | Goldberg et al. | |
| 2021/0168623 A1* | 6/2021 | Gupta | H04W 24/02 |

OTHER PUBLICATIONS

International Search Report dated Sep. 14, 2022 in Application No. PCT/US22/33718.
Written Opinion of the International Searching Authority dated Sep. 14, 2022 in Application No. PCT/US22/33718.

* cited by examiner

*Primary Examiner* — Khoa Huynh
(74) *Attorney, Agent, or Firm* — Sughrue Mion, PLLC (57) ABSTRACT

A method and system for identifying radio transmission links for one or more cells within a network. The method includes receiving location data with respect to a cell within the network, determining if a first line of sight is substantially clear between the cell and a first nearest radio transmitter to the cell, upon determining that the first line of sight is substantially clear between the cell and the first nearest radio transmitter to the cell, determining if the first nearest radio transmitter is a first transmission medium location, and upon determining that the first nearest radio transmitter is the first transmission medium location, creating a radio transmission link between the cell and the first nearest radio transmitter to the cell.

15 Claims, 8 Drawing Sheets

ULTRA-BROADBAND RADIO LINK IDENTIFICATION FOR OUTDOOR SMALL CELL SITE LOCATIONS

CROSS REFERENCE TO RELATED APPLICATIONS

This application is a National Stage of International Application No. PCT/US2022/033718 filed Jun. 16, 2022.

BACKGROUND

Technical Field

The present disclosure relates to identifying ultra-broadband radio ("UBR") links for small cell site locations, such as outdoor small cells, by checking a line-of-sight between two radio transceivers to ensure the highest performance of a wireless link.

Background

Cellular networks generally require a significant amount of bandwidth during peak times and a lower amount of bandwidth during other times. Network congestion can occur when a network node or link carries more data than it can handle, which reduces the quality of service. The effect of this congestion and lower bandwidth can include queueing delay, packet loss, blocking new connections, etc. Deploying dedicated high-speed links, such as fiber, or high-speed microwave to every base station/macro-cell or adding additional macro-cells, in order to improve bandwidth can be costly and inefficient. To counter this, cellular networks can typically employ a small cell network in addition to their existing macro-layer network or macro-cells to improve network availability, coverage, quality, resilience, and throughput, particularly with respect to "5G" networks. Such small cells can be used to offload traffic from the macro-cells, or from the macro layers within the network. Generally, small cells are low-powered radio access nodes employed by wireless carriers to expand the density of existing wireless network, such as that of macro cells or base stations. These small cells can operate within a licensed or unlicensed spectrum, and can generally include femtocells, picocells, and microcells, among others. In addition, such small cells can be installed in various indoor and outdoor locations, such as on buildings, street posts, poles, facades, and on ceilings within indoor spaces, among other places.

While network operators can generally determine coverage areas for macro-cells or base stations having antennas above building clutter within a geographic area, there is no efficient method of determining network coverage and identifying links for small cells within the network. In particular, when small cells (and their antennas) are near rooftop level or below building rooftops, then the size and shape of the buildings can influence the signals as they propagate down the streets and diffract around corners. Hence, what is needed is a method and system that can efficiently and accurately identify ultra-broadband radio ("UBR") links for small cell site locations and further provide a visual representation of such small cell sites on a map.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented further below.

A method, system, apparatus, and computer-readable medium are disclosed that can efficiently and accurately identify ultra-broadband radio ("UBR") links for small cell site locations, such as outdoor small cells, by checking the line-of-sight ("LOS") between two radios transmitters, receivers, or transceivers to ensure the highest performance of a wireless link. Here, the UBR identification method can run periodically and provide information on small cells in addition to providing suggested connectivity of small cell sectors, thereby improving radio frequency propagation, and reducing network congestion.

According to example embodiments, a computer-implemented method of identifying radio transmission links for one or more cells within a network includes: receiving location data with respect to a cell within the network; determining if a first line of sight is substantially clear between the cell and a first nearest radio transmitter to the cell; upon determining that the first line of sight is substantially clear between the cell and the first nearest radio transmitter to the cell, determining if the first nearest radio transmitter is a first transmission medium location; and upon determining that the first nearest radio transmitter is the first transmission medium location, creating a radio transmission link between the cell and the first nearest radio transmitter to the cell.

In addition, the method may include upon determining that the first nearest radio transmitter is not the first transmission medium location, determining if a second nearest radio transmitter is a second transmission medium location.

Further, the method may include upon determining if the second nearest radio transmitter is a second transmission medium location, creating a link between the cell and the second nearest radio transmitter.

Also, the method may include upon determining if the second nearest radio transmitter is not a second transmission medium location, calculating a distance between the cell and a third nearest radio transmitter to the cell having a third transmission medium location.

In addition, the method may include upon calculating the distance between the cell and the third nearest radio transmitter to the cell having a third transmission medium location, determining if the calculated distance is below a threshold value.

Further, the method may include upon determining that the calculated distance is below the threshold value, creating a link between the cell and the third nearest radio transmitter.

Moreover, the method may include wherein the first transmission medium location is comprised of a fiber optic network location or Point of Presence (POP).

Also, the method may include wherein the second transmission medium location is comprised of a microwave site.

Further, the method may include wherein the third nearest radio transmitter is comprised of a manhole or manhole cover adapted for signal propagation.

In addition, the method may further include displaying a visual representation of the link between the cell and the first nearest radio transmitter to the cell on a graphical user interface.

In other example embodiments, an apparatus for identifying radio transmission links for one or more cells within a network is disclosed, including a memory storage storing computer-executable instructions; and a processor communicatively coupled to the memory storage, wherein the processor is configured to execute the computer-executable instructions and cause the apparatus to receive, from a central sever, location data with respect to a cell within the network; determine if a first line of sight is clear between the cell and a first nearest radio transmitter to the cell; upon determining that the first line of sight is clear between the cell and the first nearest radio transmitter to the cell, determine if the first nearest radio transmitter is a first transmission medium location; and upon determining that the first nearest radio transmitter is the first transmission medium location, create a link between the cell and the first nearest radio transmitter to the cell.

In addition, the computer-executable instructions, when executed by the processor, may further cause the apparatus to upon determining that the first nearest radio transmitter is not the first transmission medium location, determine if a second nearest radio transmitter is a second transmission medium location.

Also, the computer-executable instructions, when executed by the processor, may further cause the apparatus to upon determining if the second nearest radio transmitter is a second transmission medium location, create a link between the cell and the second nearest radio transmitter.

Moreover, the computer-executable instructions, when executed by the processor, may further cause the apparatus to upon determining if the second nearest radio transmitter is not a second transmission medium location, calculate a distance between the cell and a third nearest radio transmitter to the cell having a third transmission medium location.

In addition, the computer-executable instructions, when executed by the processor, may further cause the apparatus to upon calculating the distance between the cell and the third nearest radio transmitter to the cell having a third transmission medium location, determine if the calculated distance is below a threshold value.

Also, the computer-executable instructions, when executed by the processor, may further cause the apparatus to upon determining that the calculated distance is below the threshold value, create a link between the cell and the third nearest radio transmitter.

In addition, the first transmission medium location may include a fiber optic network location or Point of Presence (POP).

Further, the second nearest radio transmitter may include a manhole or manhole cover adapted for signal propagation.

Moreover, the computer-executable instructions, when executed by the processor, may further cause the apparatus to display a visual representation of the link between the cell and the first nearest radio transmitter to the cell on a graphical user interface.

According to other example embodiments, a non-transitory computer-readable medium includes computer-executable instructions for identifying radio transmission links for one or more cells within a network by an apparatus is disclosed, wherein the computer-executable instructions, when executed by at least one processor of the apparatus, cause the apparatus to receive location data with respect to a cell within the network; determine if a first line of sight is substantially clear between the cell and a first nearest radio transmitter to the cell; upon determining that the first line of sight is substantially clear between the cell and the first nearest radio transmitter to the cell, determine if the first nearest radio transmitter is a first transmission medium location; and upon determining that the first nearest radio transmitter is the first transmission medium location, create a link between the cell and the first nearest radio transmitter to the cell.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure, a display page may include information residing in the computing device's memory, which may be transmitted from the computing device over a network to a central database center and vice versa. The information may be stored in memory at each of the computing device, a data storage resided at the edge of the network, or on the servers at the central database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones, personal computers, tablets, servers, laptop computers, personal digital assistants (PDAs), roaming devices, wireless devices (such as a wireless email device or other device capable of communicating wirelessly with a computer or communications network), or any other type of network device that may communicate over a network and handle electronic transactions.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure. For example, the portal can be a web page accessed with a web browser, mobile device application, or any application or software residing on a computing device.

Figure 1:
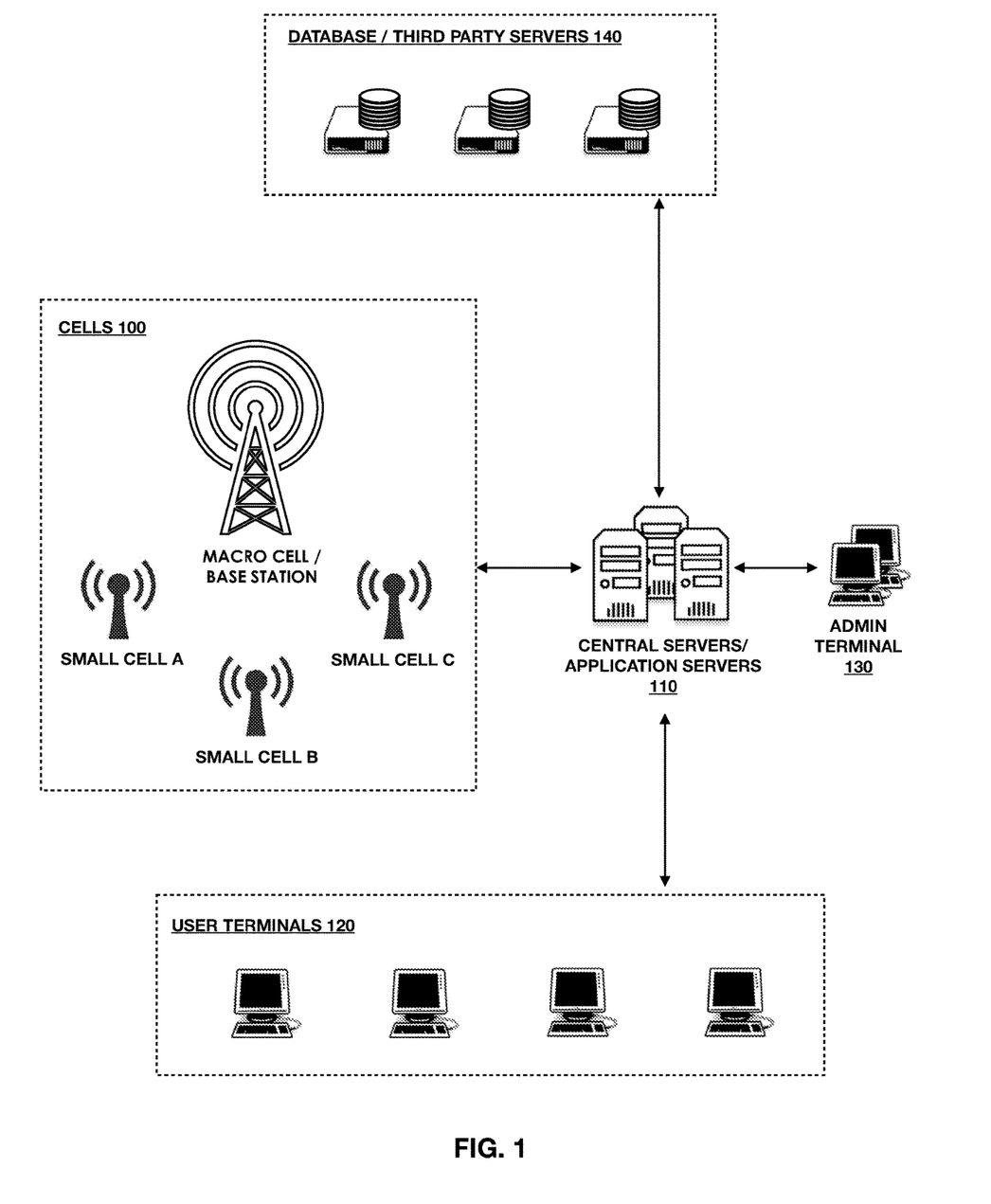
FIG. 1 illustrates a diagram of a general network architecture according to one or more embodiments.

FIG. 1 illustrates a general network architecture according to one or more embodiments. Referring to FIG. 1, cells 100 can be in bi-directional communication over a network with central servers, databases, or application servers 110 of one or more embodiments. In particular, cells 100 can include any number of macro-cells, base transceivers, base stations, radio transmitters/transceivers/receivers, and small cells or nodes. For example, it is contemplated within the scope of the present disclosure that there may be any number of macro-cells that communicate with each other and/or with their corresponding small cells to improve and expand cellular and wireless network (e.g., 5G, 4G, Long-Term Evolution, etc.) coverage, reliability, throughput, and quality of the macro-cells or the network provider within a given geographical region or area. It is also contemplated within the scope of the present disclosure that any of cells 100, including macro-cells and small cells and any variations thereof, such as femtocells, picocells, and microcells, may be referred to herein as cells. As shown herein, for exemplary purposes, small cells A, B, and C may be in communication with a central or main macro-cell (or multiple macro-cells) or base station tower network.

Still referring to FIG. 1, one or more user terminals 120 can also be in bi-directional communication over a network with central servers 110. Specifically, central servers 110 can receive and process user requests with respect to an UBR link identification engine and algorithm of one or more embodiments and further report and present the results to each user terminal 120. Here, each user terminal 120 may further access and view the GUI portal and map with respect to the UBR link identification process and system of one or more embodiments. In addition, an admin terminal 130 may also be in bi-directional communication with central servers 110 to manage and monitor various types of network data, known performance indicators ("KPIs"), credentials, user privileges, and the like. Further, the UBR link identification process and system of one or more embodiments may also include one or more databases and third-party servers 140 in bi-directional communication over a network with central servers 110. Here, servers 140 can provide various types of data storage, data streams, data feeds, and/or provide various types of third-party support services to central servers 110. However, it is contemplated within the scope of the present disclosure that the UBR link identification process and system of one or more embodiments can include any type of general network architecture.

Still referring to FIG. 1, one or more of servers and terminals 110-140 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers and terminals 110-140 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers and terminals 110-140. For example, the bus may be a communication bus, a cross-over bar, a network, or the like. The bus may be implemented using single or multiple (two or more) connections between the set of components of one or more of servers and terminals 110-140. The disclosure is not limited in this regard.

One or more of servers and terminals 110-140 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any related art processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers and terminals 110-140 and/or of the set of components of one or more of servers and terminals 110-140 (e.g., memory, storage component, input component, output component, communication interface, rendering component).

One or more of servers and terminals 110-140 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers and terminals 110-140 may store information and/or computer-readable instructions and/or code related to the operation and use of one or more of servers and terminals 110-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers and terminals 110-140 may further comprise an input component. The input component may include one or more components that permit one or more of servers and terminals 110-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers and terminals 110-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers and terminals 110-140 may further comprise a communication interface. The communication interface may include a receiver component, a transmitter component, and/or a transceiver component. The communication interface may enable one or more of servers and terminals 110-140 to establish connections and/or transfer communications with other devices (e.g., a server, another device). The communications may be effected via a wired connection, a wireless connection, or a combination of wired and wireless connections. The communication interface may permit one or more of servers and terminals 110-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
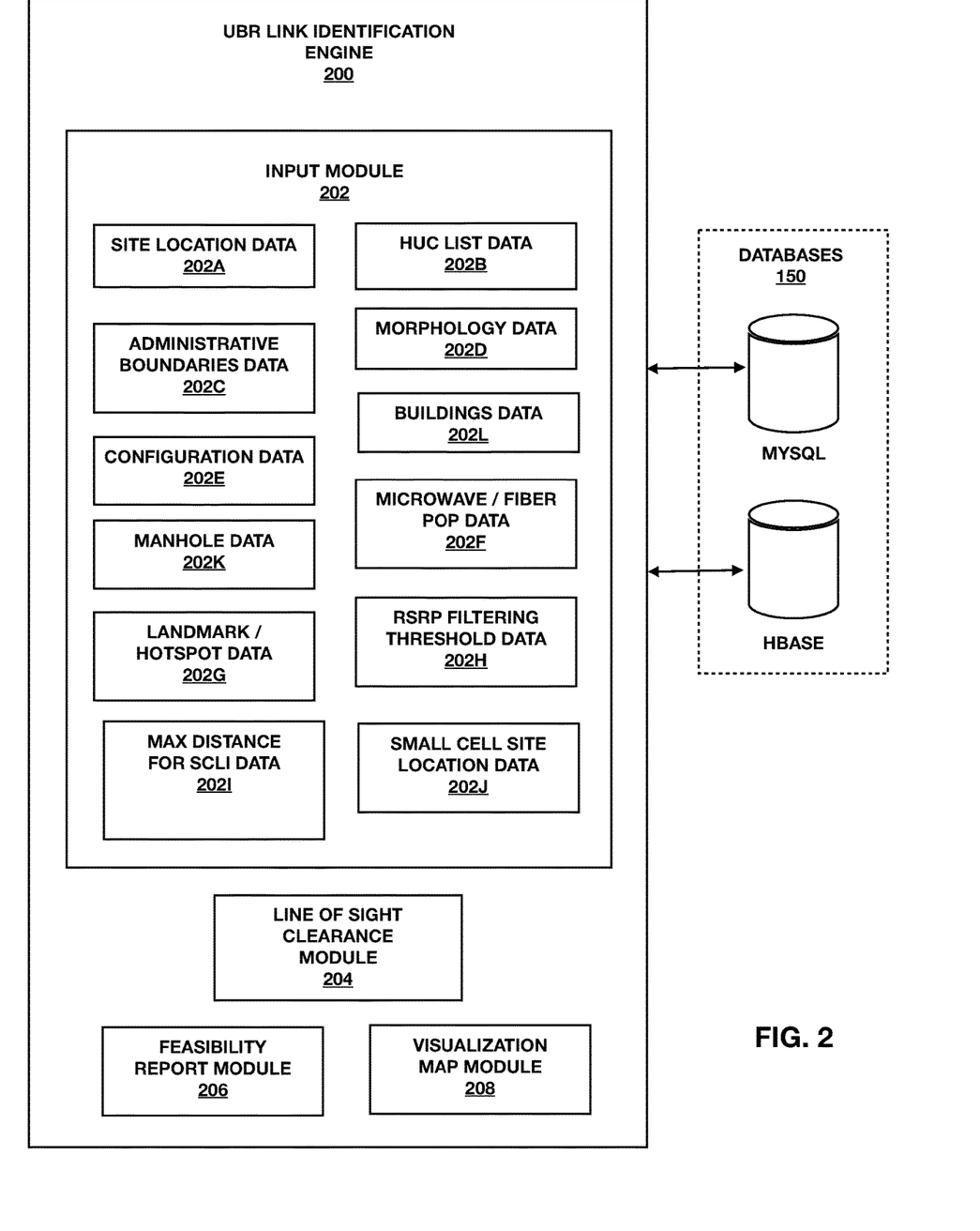
FIG. 2 is a block diagram of a system for UBR link identification according to one or more embodiments.

FIG. 2 is a block diagram of a system for UBR link identification according to one or more embodiments. Referring to FIG. 2, a UBR link identification engine 200 can include an input module 202 configured to provide input data and parameters to the UBR link identification engine 200 and algorithm disclosed herein. Here, input module 202 can further include sub-module input parameters or components for site location data 202A, highly utilized cell sample list ("HUC") data 202B, administrative boundaries data 202C, morphology data 202D, configuration data 202E, fiber point of presence ("POP") and microwave data 202F, landmark and hotspot data 202G, reference signal received power ("RSRP") filtering threshold data 202H, max distance for small cell site location identification data 202I, small cell ("SC") site location data 202J, manhole data 202K, and buildings data 202L.

Still referring to FIG. 2, any of the input sub-modules 202A-202L can retrieve data therefrom or store data thereto databases 150, which can include among others, one or more MySQL databases, Hbase, or any other type of relational database management system ("RDBMS"). In particular, site location data module 202A can retrieve and receive input with respect to one or more or all sites and locations within a selected network, including site data such as latitude, longitude, azimuth, band details, extended cell global identification ("ECGI") antenna height, and electrical tilt, among others, to be used by the UBR link identification engine 200. The HUC list data 202B can include a list of the HUC samples within a pre-defined or user defined period of time to be used by UBR link identification engine 200. As used herein, an HUC can be any cell macro-cell, small cell, or otherwise, preferably a macro-cell or base station, that is highly utilized within a network, has above average utilization or traffic within a network, has a degree of utilization that is above a pre-defined utilization parameter, or has a degree of utilization that meets or is above an industry recognized standard with respect to network cell utilization. Further, any type of algorithm, engine, process, or application may be used to identify the HUCs within the list with respect sub-module 202B. In addition, small cell site location data 202J can include any location and site information pertaining to the actual or potential deployment of small cells on any structure, such as buildings or poles, within a geographic region. Such information can include height, azimuth, and direction information, among others, of any radio or UBR with respect to any of the small cells.

Still referring to FIG. 2, administrative boundaries data sub-module 202C can include various geographical boundaries to be used by the UBR link identification engine 200. Morphology data sub-module 202D can include various geographic area morphologies (e.g., dense urban, sub urban, urban, rural, etc.) and building data sub-module 202L can include various building and structure data (e.g., location, size, height, etc.) to be used by the UBR link identification engine 200, wherein modules 202D and 202L can each receive data from different data sources. Configuration data sub-module 202E can include various types of configuration within a network to be used by the UBR link identification engine 200. Microwave and Fiber Point of Presence ("POP") or fiber-optic network data sub-module 202F can include site and location related information pertaining to fiber PoPs/fiber-optics to be used by the UBR link identification engine 200, including microwave data, XPIC site data, microwave links, and microwave radio transmission. Manhole data sub-module 202K can include various types of information, including location information, pertaining to manholes or manhole covers having antennas for signal propagation. Landmark and hotspot data sub-module 202G can include various site related location data pertaining to various types of city or regional landmark sites and known wireless hotspot sites to be used by the UBR link identification engine 200. Here, parameters pertaining to any of sub-modules 202A-202L may be pre-defined and retrieved from databases 100. However, it is contemplated within the scope of the present disclosure that any of the data pertaining to sub-modules 202A-202L may also be user defined and configurable.

Still referring to FIG. 2, RSRP filtering threshold data sub-module 202H can provide configurable and user defined input parameters. In particular, in one exemplary embodiment, RSRP filtering threshold or condition can be configured, defined, predefined, or set to be less than −95 dBm or (<−95 dBm) or less than or equal to −95 dBm (<=−95 dBm) to be used by the UBR link identification engine 200. However, it is contemplated within the scope of the present disclosure that the RSRP filtering threshold can be set to any suitable value depending on the desired output of the UBR link identification engine and other network parameters, variables, and constraints. Maximum distance to small cell site location identification data sub-module 202I can allow the user to configure, define, or set a maximum distance for a small cell site location based on a calculated cell range or defined value for a particular morphology. TABLE 1 illustrates exemplary data for various types of morphologies and their associated maximum distances (which can be fixed values) which can further be used by the UBR link identification engine 200. According to a non-limiting example embodiment, a distance for potential candidate small cell site locations with respect to planned or on-air macro cells can be configured at about 156 m, wherein such candidate small cells fall can within or less than the about 156 m distance of the planned or on-air macro cells.

TABLE 1

| MORPHOLOGY | DISTANCE |
| --- | --- |
| Dense Urban | 500 m |
| Sub Urban | 1250 m |
| Urban | 800 m |
| Rural | 800 m |

Still referring to FIG. 2, the UBR link identification engine 200 can also include a line-of-sight ("LOS") clearance module 204 that can use any one or more of the input parameters within input module 202 and its associated sub-modules 202A-202L in order to check the LOS clearance between two UBR's or radio transceiver, transmitter, or receiver of the cells to ensure the highest performance of a wired or wireless link, which will be discussed later in this disclosure in more detail. In addition, UBR link identification engine 200 can also include a feasibility report module 206 that can output the results of the UBR link feasibility of the cells to the user. In addition, UBR link identification engine 200 can also include a visualization map module 208 that can output and visually display via a GUI portal the identified candidate small cell site locations and information pertaining to the UBR link feasibility.

Figure 3:
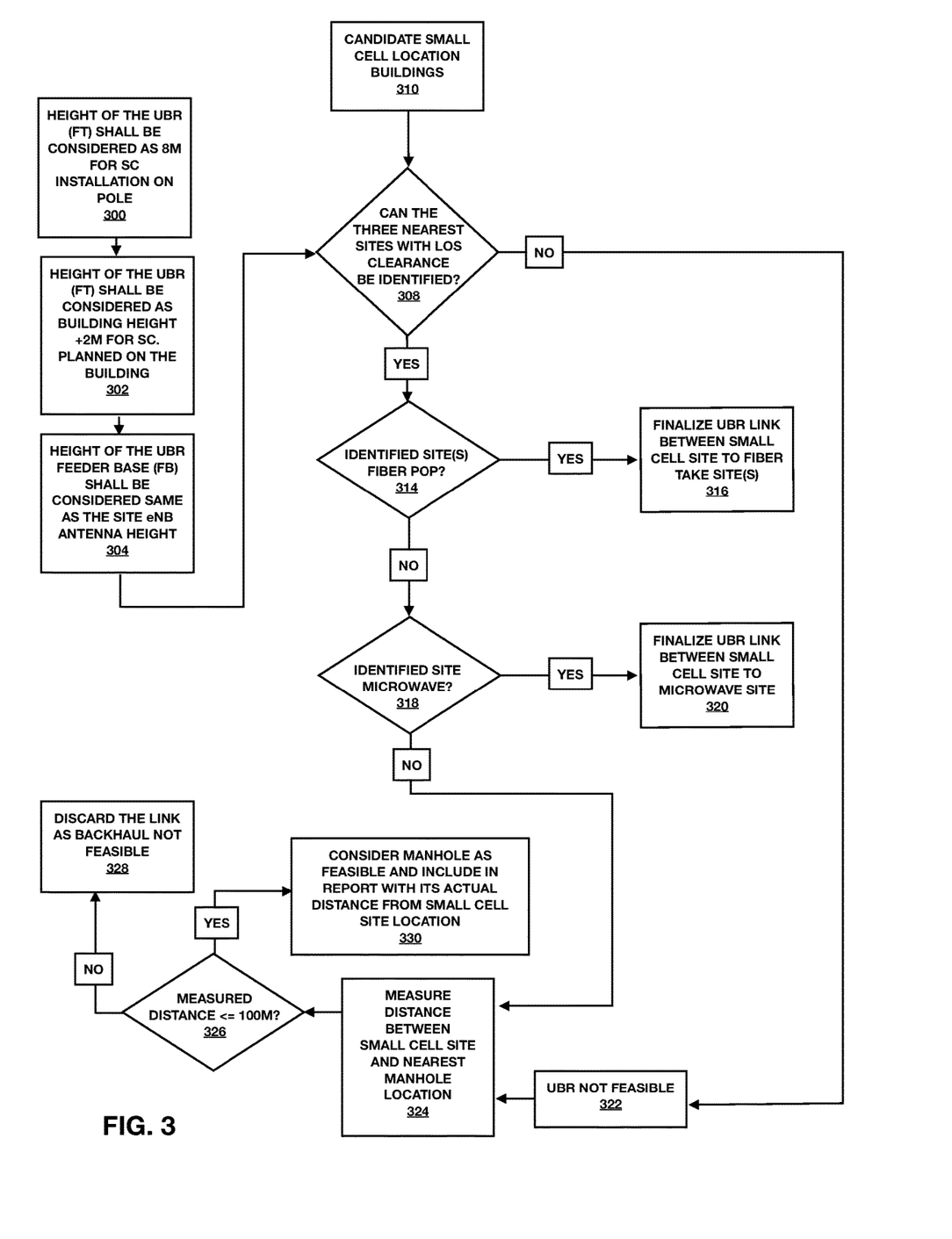
FIG. 3 illustrates a flowchart of a UBR link identification method according to one or more embodiments.

FIG. 3 illustrates a flowchart of UBR link identification method according to one or more embodiments. Referring to FIG. 3, at step 310, wherein a list of candidate small cell ("SC") site location, such as the location of buildings where small cells sites are planned, can be received and retrieved from one or more databases. In addition, at step 310, the process can also identify neighboring sites (such as microwave and fiber take-off sites/radio transmission sites) from the identified SC site locations that are within a defined or predefined radius of about one (1) km from the SC site locations. In addition, the UBR link identification engine and process can also apply a certain set of defined or predefined criteria's, conditions, values, and input parameters with respect to the UBR and SCs depending on the SC location properties. Specifically, at step 300, if the SC planned installation is on a pole, the process can consider or define the height of the UBR to be a defined or predefined value, such as about 8 m. At step 302, if the SC planned installation is on a building (such as a rooftop), the process can consider or define the height of the UBR to be another defined or predefined value, such as the height of the building plus an additional about 2 m (which can also be user defined to any value). At step 304, the height of the UBR (its feeder base) can be defined or predefined to be the same as the site eNB antenna height.

Still referring to FIG. 3, once the SC site location information of step 310 is received and the values of any one or more of steps 300-304 considered, assigned, or applied, then the process can proceed to step 308. At step 308, the process can identify the Fresnal zones for clearance. Here, the Fresnal zone clearance can be represented by the formula below, which is the general equation for calculating the Fresnal zone radius at point P in between the endpoints of a link and wherein n=1 for the first Fresnal zone clearance:

$$F_n = \sqrt{\frac{n\lambda d_1 d_2}{d_1 + d_2}}, \quad d_1, d_2 \gg n\lambda,$$

Where,
$F_n$ is the nth Fresnal zone radius,
$d_1$ is the distance of P from one end,
$d_2$ is the distance of P from the other end,
$\lambda$ is the wavelength of the transmitted signal.

Still referring to FIG. 3, at step 308, using the foregoing Fresnal zone clearance formula, the process can determine or decide if a LOS is clear between a particular or selected SC location and a first tier neighboring CSS site. In particular, at step 308, the process can determine if the three nearest sites (or at least one site) having LOS clearance with one or more SC site locations/buildings can be identified, and if yes, then the process can proceed to step 314, or if no, then the process can proceed to step 322. At step 314, the process can then determine if the three identified sites (or at least one site) can be identified as fiber POP take site(s) (whereby fiber take conditions for each identified neighboring site is can be checked), and if yes, then the process can proceed to step 316, and if no, the process can proceed to step 318. At step 316, the process can finalize, designate, and create the UBR link between the SC site location/building and the identified Fiber POP take site(s). At step 318, the process can determine if the three nearest sites (or at least one site) can be identified as microwave site(s), and if yes, then the process can proceed to step 320, and if no, the process can proceed to step 322. At step 320, the process can finalize, designate, and create the UBR link between the SC site location/building and the identified microwave site(s).

Still referring to FIG. 3, at step 322, the UBR link for the SC site location/building can be marked, identified, or assigned as being not feasible and proceed to step 324. At step 324, the process can measure the distance between the selected or particular SC site location and the nearest manhole location (or manhole radio transmitter location). Next, at step 326, the process can decide or determine whether the measured distance is less than a defined or predefined value, such as less than or equal to 100 m, and if yes, then the process can proceed to step 330, or if no not, then the process can proceed to step 328. In particular, at step 328, the process can discard the link as a backhaul portion of the network being not feasible. Alternatively, at step 330, the process can determine, designate, mark, or assign the manhole or manhole cover as being a feasible UBR link with the SC site location and further report the actual distance between the manhole and the SC site location.

Figure 4:
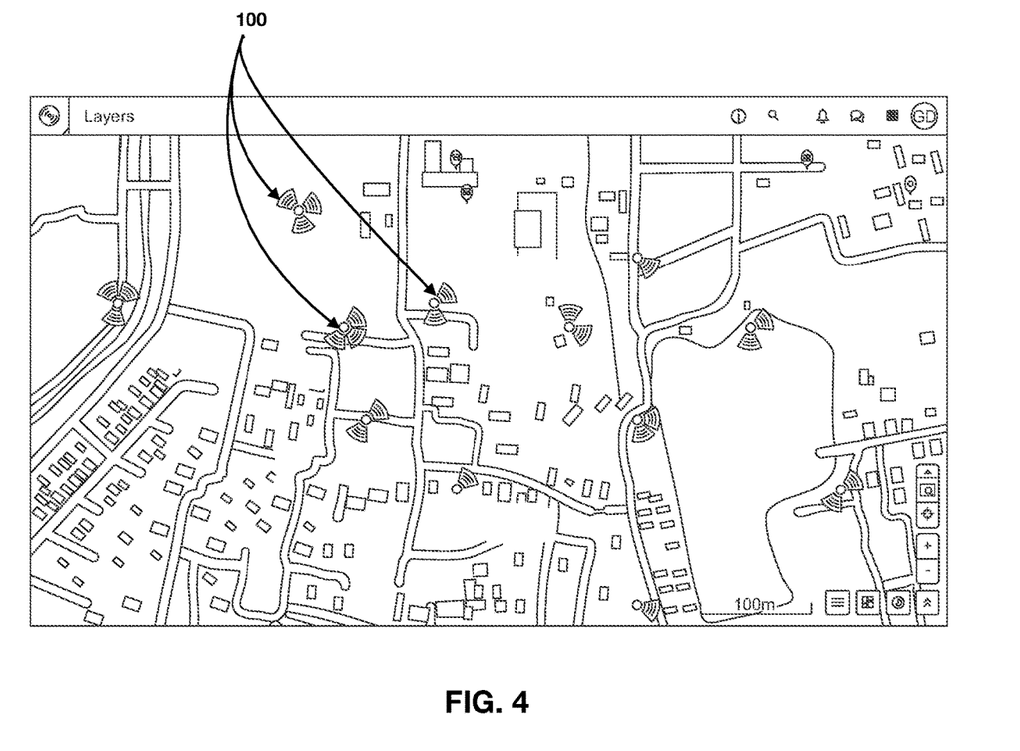
FIG. 4 illustrates an example screen of a graphical user interface map of the UBR link identification according to one or more embodiments.

FIG. 4 illustrates one non-limiting exemplary embodiment of cells 100 (such as the identified small cell site locations) displayed with respect to their identified site locations (such as buildings or poles) on a Graphical Information System ("GIS") or GUI portal map view. Specifically, identified cells 100 on the maps of FIGS. 4-8 can represent candidate outdoor spaces, structures, poles, or buildings for which small cells and their corresponding UBRs, radio transceivers/transmitters/receivers, or antennas can be deployed by a radio access network provider.

Figure 5:
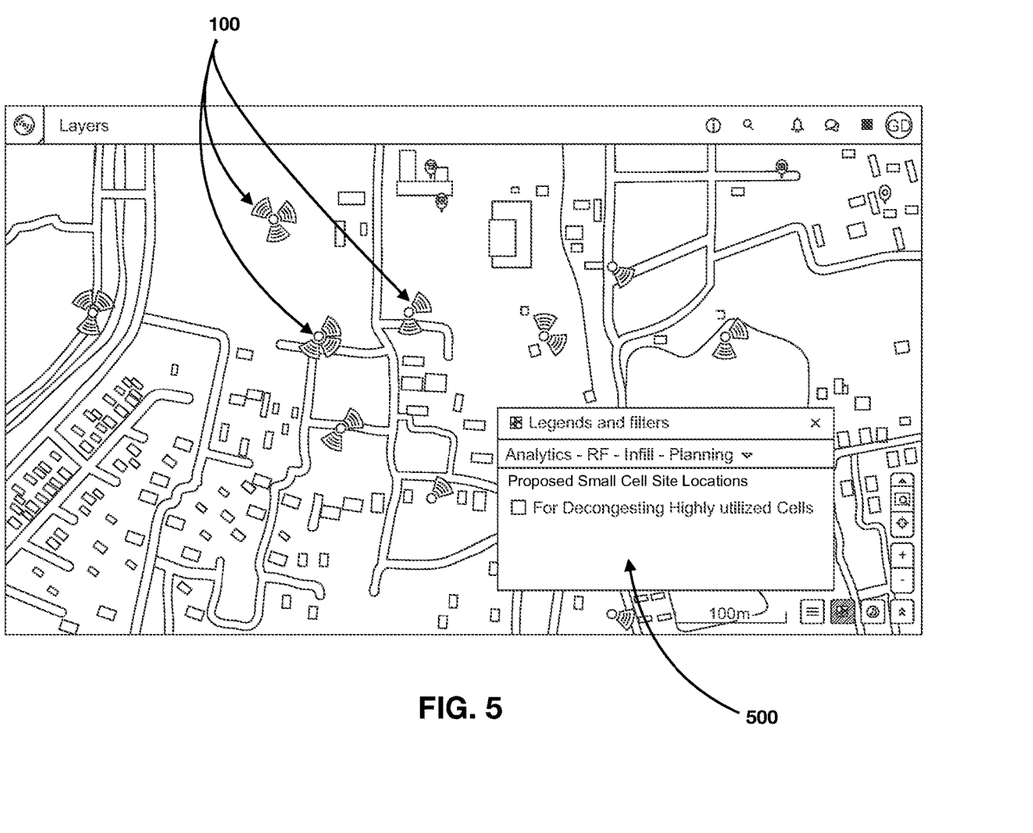
FIG. 5 illustrates another example screen of a graphical user interface map of the UBR link identification according to one or more embodiments.

FIG. 5 illustrates another non-limiting exemplary embodiment of cells 100 (such as the identified small cell site locations) with respect to their identified site locations. Here, the UBR link identification process of the disclosure can also display a legend and additional filters 500 with respect to the GUI portal map view. For example, the user can select a filtering element on the GUI that can show small cell site locations on the map that can be used for decongesting or offloading HUCs.

Figure 6:
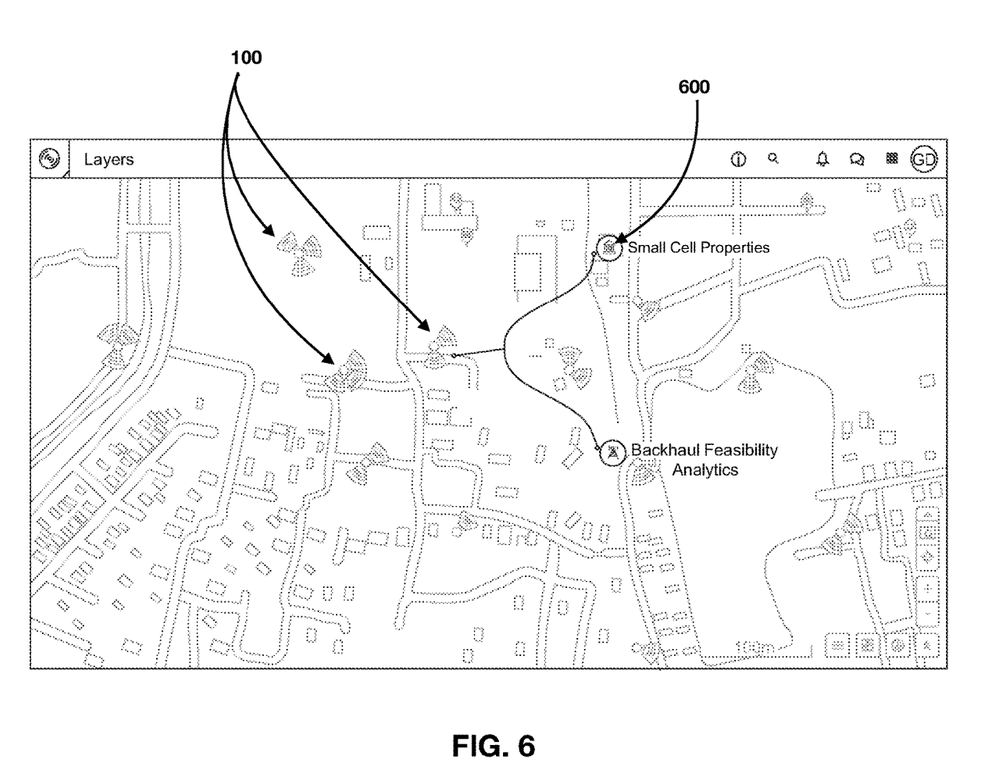
FIG. 6 illustrates another example screen of a graphical user interface map of the UBR link identification according to one or more embodiments.
Figure 7:
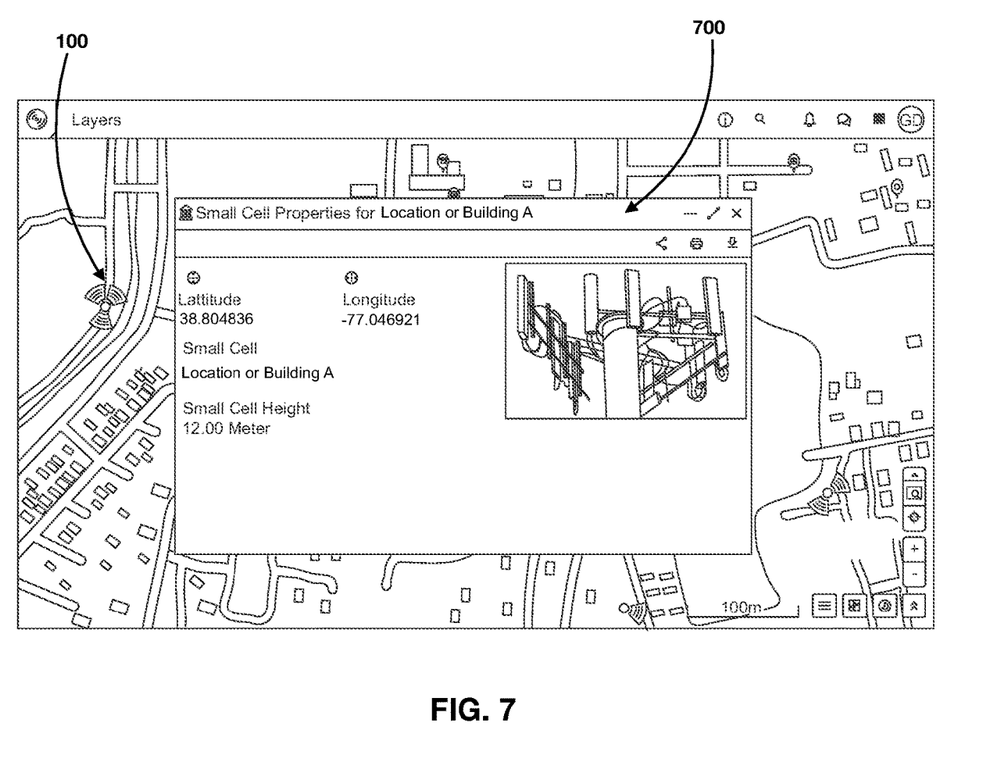
FIG. 7 illustrates another example screen of a graphical user interface map of the UBR link identification according to one or more embodiments.

FIG. 6 illustrates another non-limiting exemplary embodiment of cells 100 (such as the identified small cell site locations) with respect to their identified site locations on a Graphical Information System ("GIS") or GUI portal map view. Here, if the user selects any of the cells 100 on the GUI portal map view, then the process of the disclosure can also display an expanded "spider" view 600 of that particular selected cell. Here, the expanded view display can allow the user to view the various properties or parameters that are pertinent to the selected cell and cell site location, including but not limited to various small cell properties and backhaul feasibility analytics. Here, if the user further selects on one of the expanded properties within the GUI portal, such as "Small Cell Properties," then the user can be taken to the GUI portal of FIG. 7. FIG. 7 illustrates a GUI window element 700 that can display various properties pertaining to the selected small cell site location, such as longitude/latitude data and height for the small cell, including a photograph of the location, building, pole, or post for the suggested small cell site location for deployment.

Figure 8:
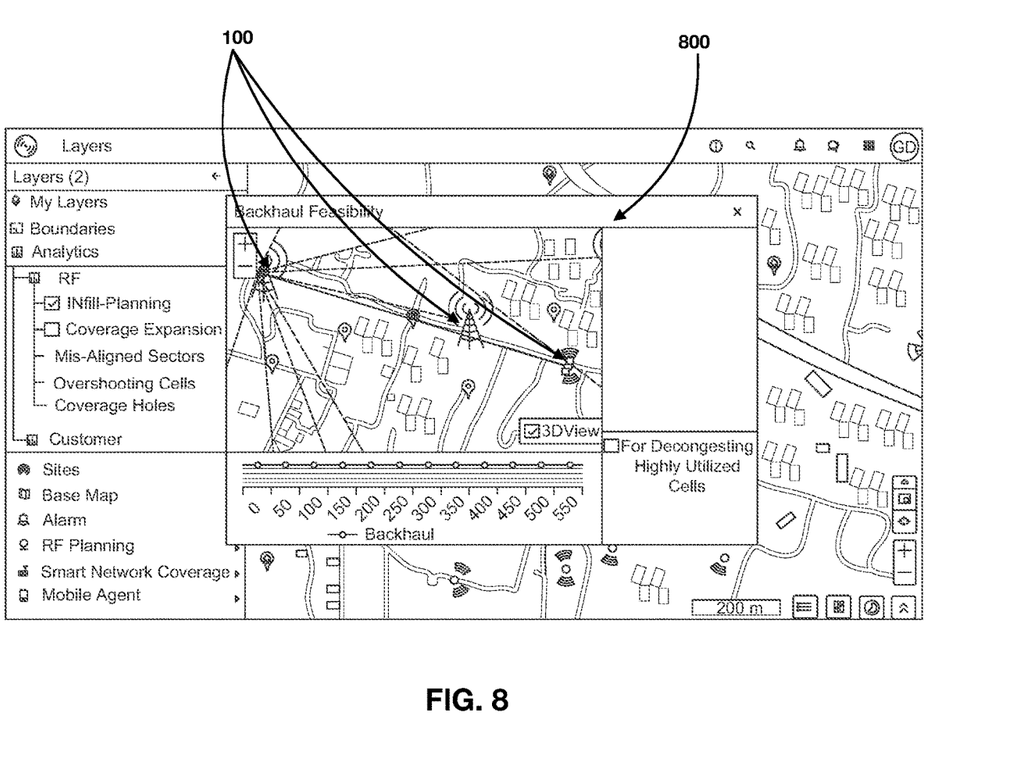
FIG. 8 illustrates another example screen of a graphical user interface map of the UBR link identification according to one or more embodiments.

FIG. 8 illustrates another non-limiting exemplary embodiment of cells 100 (such as the identified small cell site locations) with respect to their identified site locations on a Graphical Information System ("GIS") or GUI portal map view. In particular, FIG. 8 illustrates a graphical window 700 that further illustrates the created or generated UBR links between a plurality of cells 100 and their determined nearest radio transmitters/transceivers/receivers (or in the alternative, the generated UBR links between the cells) via the UBR link identification process of the disclosure with respect to backhaul network feasibility, including the distances between the cells and their linked corresponding radio transmitters or the cells themselves. Here, with respect to any of FIGS. 4-8, such outputted visual data and reports can be stored within a database and the user can download any data, report, or map from within any of the GUI portals.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged.

Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A computer-implemented method, performed by at least one processor, for identifying radio transmission links for one or more cells within a network, the method comprising:
   receiving location data with respect to a cell within the network;
   finding, based on the location data, multiple radio transmitters as candidates;
   determining, for each of the candidates, if a first line of sight is clear between the cell and each of the candidates;
   upon determining that there is one or more candidates with a clear line of sight, determining if each of the one or more candidates with the clear line of sight are located at a first transmission medium location; and
   upon determining that there is one or more candidates located at the first transmission medium location, creating a link between the cell and at least one of the one or more candidates located at the first transmission medium location.

2. The method of claim 1, further comprising:
   upon determining that there are no candidates located at the first transmission medium location, determining if each of the one or more candidates with the clear line of sight is located at a second transmission medium location; and
   upon determining that there is one or more candidates located at the second transmission medium location, creating a link between the cell and at least one of the one or more candidates located at the second transmission medium location.

3. The method of claim 2, further comprising:
   upon determining there are no candidates located at the second transmission medium location, determining if each of the one or more candidates with the clear line of sight is located at a third transmission medium location;
   upon determining that there is one or more candidates located at the third transmission medium location, calculating, for each of the one or more candidates located at the third transmission medium location, a distance from the cell;
   determining, for each of the one or more candidates, if the calculated distance is below a threshold value;
   upon determining that there is one or more calculated distances that are below the threshold value, creating a link between the cell and at least one of the one or more candidates located at a third transmission medium location with the distance that is below the threshold.

4. The method of claim 3, wherein the third nearest radio transmitter is comprised of a manhole or manhole cover adapted for signal propagation.

5. The method of claim 2, wherein the second transmission medium location is comprised of a microwave site.

6. The method of claim 1, wherein the first transmission medium location is comprised of a fiber optic network location or Point of Presence (POP).

7. The method of claim 1, further comprising:
   displaying a visual representation of the link between the cell and the first nearest radio transmitter to the cell on a graphical user interface.

8. The method of claim 1, wherein multiple links are created between the cell and the candidates located at the first transmission medium location.

9. An apparatus for identifying radio transmission links for one or more cells within a network, the apparatus comprising:
   a memory storage storing computer-executable instructions; and
   a processor communicatively coupled to the memory storage, wherein the processor is configured to execute the computer-executable instructions and cause the processor to:
      receive, from a central sever, location data with respect to a cell within the network;
      find, based on the location data, multiple radio transmitters as candidates;
      determine, for each of the candidates if a first line of sight is clear between the cell and each of the candidates;
      upon determining that there is one or more candidates with a clear line of sight, determine if each of the one or more candidates with the clear line of sight are located at a first transmission medium location; and
      upon determining that there is one or more candidates located at the first transmission medium location, create a link between the cell and at least one of the one or more candidates located at the first transmission medium location.

10. The apparatus of claim 9, wherein the computer-executable instructions, when executed by the processor, further cause the processor to:
    upon determining that there are no candidates located at the first transmission medium location, determine if each of the one or more candidates with the clear line of sight is located at a second transmission medium location; and
    upon determining that there is one or more candidates located at the second transmission medium location, create a link between the cell and at least one of the one or more candidates located at the second transmission medium location.

11. The apparatus of claim 10, wherein the computer-executable instructions, when executed by the processor, further cause the processor to:
    upon determining there are no candidates located at the second transmission medium location, determine if each of the one or more candidates with the clear line of sight is located at a third transmission medium location;
    upon determining that there is one or more candidates located at the third transmission medium location, calculate, for each of the one or more candidates located at the third transmission medium location, a distance from the cell;
    determine, for each of the one or more candidates, if the calculated distance is below a threshold value;
    upon determining that there is one or more calculated distances that are below the threshold value, create a link between the cell and at least one of the one or more candidates located at a third transmission medium location with the distance that is below the threshold.

12. The apparatus of claim 10, wherein the second nearest radio transmitter is comprised of a manhole or manhole cover adapted for signal propagation.

13. The apparatus of claim 9, wherein the first transmission medium location is comprised of a fiber optic network location or Point of Presence (POP).

14. The apparatus of claim 9, wherein the computer-executable instructions, when executed by the processor, further cause the processor to:

displaying a visual representation of the link between the cell and the first nearest radio transmitter to the cell on a graphical user interface.

15. A non-transitory computer-readable medium comprising computer-executable instructions for identifying radio transmission links for one or more cells within a network by an apparatus, wherein the computer-executable instructions, when executed by at least one processor of the apparatus, cause the apparatus to:

receive location data with respect to a cell within the network;

find, based on the location data, multiple radio transmitters as candidates;

determine, for each of the candidates, if a first line of sight is clear between the cell and each of the candidates;

upon determining that there is one or more candidates with a clear line of sight, determine if each of the one or more candidates with the clear line of sight are located at a first transmission medium location; and upon determining that there is one or more candidates located at the first transmission medium location, create a link between the cell and at least one of the one or more candidates located at the first transmission medium location.

* * * * *